(12) United States Patent
Chen

(10) Patent No.: US 7,509,176 B2
(45) Date of Patent: Mar. 24, 2009

(54) CIRCUIT FOR REDUCING THE WIRING NEEDED TO CONTROL THE FUNCTIONS OF A VEHICLE

(76) Inventor: Jack Chen, 300 Windsor Dr., Oak Brook, IL (US) 60523-1510

( * ) Notice: Subject to any disclaimer, the term of this patent is extended or adjusted under 35 U.S.C. 154(b) by 245 days.

(21) Appl. No.: 11/443,583

(22) Filed: May 31, 2006

(65) Prior Publication Data

US 2007/0278858 A1     Dec. 6, 2007

(51) Int. Cl.
  *G05B 15/00*  (2006.01)
  *B60L 1/00*   (2006.01)
  *B60L 1/14*   (2006.01)
  *H02J 3/00*   (2006.01)

(52) U.S. Cl. .................. 700/1; 307/10.1; 307/10.8; 307/36

(58) Field of Classification Search ............ 700/1; 307/10.1; 370/10.1, 10.8, 36
See application file for complete search history.

(56) References Cited

U.S. PATENT DOCUMENTS

| | | | |
|---|---|---|---|
| 4,654,890 A * | 3/1987 | Hasegawa et al. | 398/59 |
| 5,278,547 A * | 1/1994 | Suman et al. | 340/5.22 |
| 5,424,586 A * | 6/1995 | Hattori et al. | 307/10.1 |
| 5,508,689 A * | 4/1996 | Rado et al. | 340/3.1 |
| 6,163,079 A * | 12/2000 | Miyazaki et al. | 307/10.1 |
| 6,182,807 B1 * | 2/2001 | Saito et al. | 191/2 |
| 6,511,342 B1 * | 1/2003 | Hein et al. | 439/502 |
| 7,342,325 B2 * | 3/2008 | Rhodes | 307/10.6 |

OTHER PUBLICATIONS

Mitamura et al., "Integrated Electronic Device for Automobile Time Control Signals" IEEE 1980 p. 1-8.*

* cited by examiner

*Primary Examiner*—Albert DeCady
*Assistant Examiner*—Thomas H Stevens
(74) *Attorney, Agent, or Firm*—Robert L Marsh (57) ABSTRACT

The wiring needed to control all the functions in a vehicle is reduced, especially where the input source for operating a given function is remote from the function. A control member is provided that receives the input signal and converts it to a coded message that is applied to the power line. A function controller includes a coded reader and a control circuit for reading the code applicable to its associated function and controlling the function as instructed from the input signal. The control member also monitors the power line to insure that the message has been properly sent, and the message is repeated until proper transmission is confirmed.

17 Claims, 5 Drawing Sheets

Figure 5:
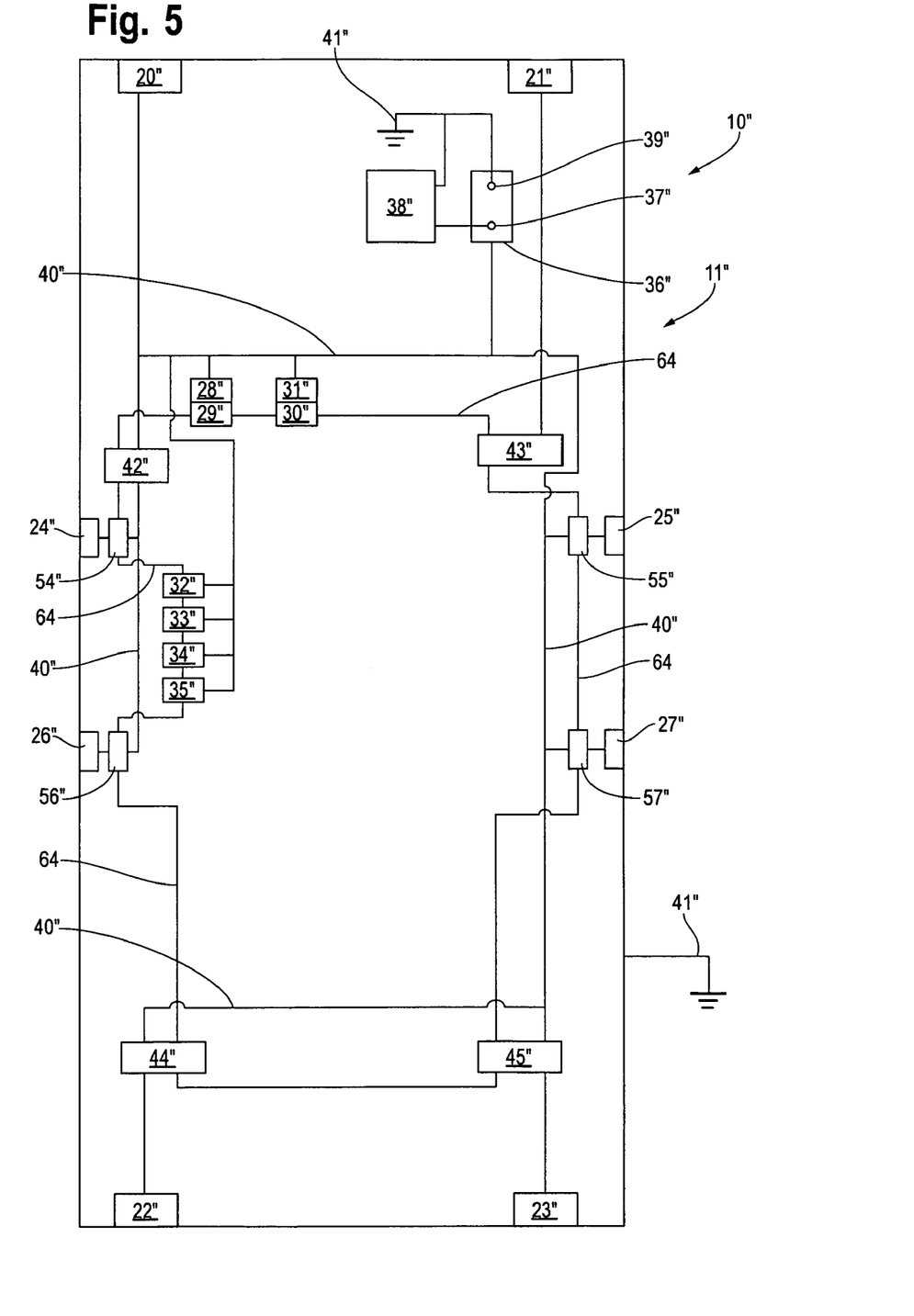
FIG. 5 is a schematic diagram of a power system for a vehicle in accordance with a third embodiment of the invention.

CIRCUIT FOR REDUCING THE WIRING NEEDED TO CONTROL THE FUNCTIONS OF A VEHICLE

The present application relates to a method of minimizing the hard wiring required to provide control to the various functions of a vehicle.

BACKGROUND OF THE INVENTION

A typical automobile has numerous electrically operated functions, such as lights, motors, sensors, and so forth, each of which must be hard wired into a source of electric power, namely the battery and generator of the vehicle. Many of the functions of the vehicle are subject to being controlled from a remote location. For example, the vehicle lights, including parking lights, headlights, and brake lights must all, in one way or another, be controllable from the driver's position in the vehicle. In order to operate all the lights from the driver's position, at least one separate wire has one end connected to the associated control near the driver's position, and the other end connected to its associated light fixture. The brake lights, for example, are illuminated when a switch is actuated by the depression of the brake pedal allowing current to flow from the battery, through the switch, and through a dedicated length of wire that extends to the brake lights. A similar wiring problem exists to permit the driver to independently raise and lower all the electrically operated windows of the vehicle. The same is true of many if not most of the electrically operated functions of a vehicle, such as a fuel gauge which is connected by dedicated hard wires to a detector in a fuel tank. The consequence is that a maze of wires extends all over a vehicle. It has been estimated that there are approximately thirty miles of wire in a typical automobile. The installation of the various wires is time consuming and costly and the wire itself contributes to the weight of the vehicle. It would be desirable, therefore, to provide a method by which the wiring needed to provide power to the various functions of a vehicle and to control those functions could be significantly reduced.

SUMMARY OF THE INVENTION

Briefly, the present invention is a method of controlling the electrical functions of a vehicle including a first function and a second function where each of the electrically powered functions is controlled by an associated control member including a first control member for controlling the first function and a second control member for controlling the second function. In accordance with the invention, a single power line connects one terminal of the source of electric power to all of the various functions of the vehicle including the first function and the second function. The second terminal of the source of power and the second terminals of all the vehicle's functions are connected to a ground, which may be the vehicle frame as is known in the art. To minimize noise and interference, the second terminal of all the functions of the vehicle may be connected to a dedicated ground line that is connected through a filter to the battery so as to eliminate the impedance and noise caused by the body of the vehicle. The control members that operate the various functions, including the first controlling member and the second controlling member have one connector attached to the same power line and the second connector attached to a ground.

Each of the first and second controlling members includes an input structure, such as a button, a switch, a rotatable controlling knob operable by the vehicle operator, or a detector that monitors some status of the vehicle such as a fuel level detector. Each controlling member also includes a coded signal generator which generates a coded message in the form of a digital signal train or a frequency varied code. The message includes an address portion for identifying the source of the message, and an instruction portion, and the instruction portion has different coded variations in response to the status, or change in status, of the input structure. The coded message is intermittently applied to the power line. Accordingly, each operation of a controlling member, such as the application of pressure to the vehicle brake pedal, results in a change in the message applied by the controlling member to the power line. Each controlling member also has a message reader connected to the power line and the control member reads the message that it applies to the power line to insure that it is readable by the associated function controller. The message is repeated intermittently until the controlling member has detected at least one readable message applied to the line.

The message from the first controlling member is unique and identifiable as having originated from the first controlling member. The second controlling member generates a message that is different from the message from the first controlling member and identifiable as originating from the second controlling member. In similar fashion, every other controlling member in the vehicle has a unique coded message that both identifies its source and conveys information regarding the status of its associated input structure.

Each of the various functions, including the first and second functions, has an associated function controller that includes a code reader connected to the power line. The code reader of each function controller can read only the message issued by the controlling member associated with that function. Accordingly, the code reader for the brake light function controller will detect and read the message inserted into the power line from the controlling member connected to the brake pedal and the code reader for the headlights function controller will read only the message applied to the power line from the controlling member connected to the light switch. The code reader for each of the various functions is connected to an operating circuit that controls the operation of the function to which it is attached.

When the operator of a vehicle applies pressure to the brake pedal, the message periodically generated by the controlling member connected to the brake pedal includes instructions applied to the power line that are deciphered only by the code reader of the brake light function controller. The operating circuit for the brake light function controller carries out the instructions by applying power to the brake lights causing them to become illuminated.

In a second embodiment of the invention, the electronically conductive body of the vehicle is not used as a ground for the control members and the function controllers. These devices have a separate ground line independent of the vehicle body so as to reduce noise in the system. It should be appreciated that electric devices in the vehicle that do not respond to messages from a remote control member would still use the electrically conductive portion of the vehicle body as a ground.

In a third embodiment of the invention, a power line is provided to apply power to all of the functions and function controllers for the vehicle and a separate information line is provided that connects all of the function controllers and all of the controlling members. The information line is separate from the power line and the ground and is preferably formed as an independent loop into which messages are applied by the controlling members and are received by the various function controllers to thereby transmit information from one part of the vehicle to another employing only the information line. It should be appreciated that in this embodiment, an independent ground line such as described with respect to the second embodiment may be also provided.

BRIEF DESCRIPTION OF THE DRAWINGS

A better understanding of the present invention will be had after a reading of the following detailed description taken in conjunction with the drawings wherein.

DETAILED DESCRIPTION OF A PREFERRED EMBODIMENT

Figure 1:
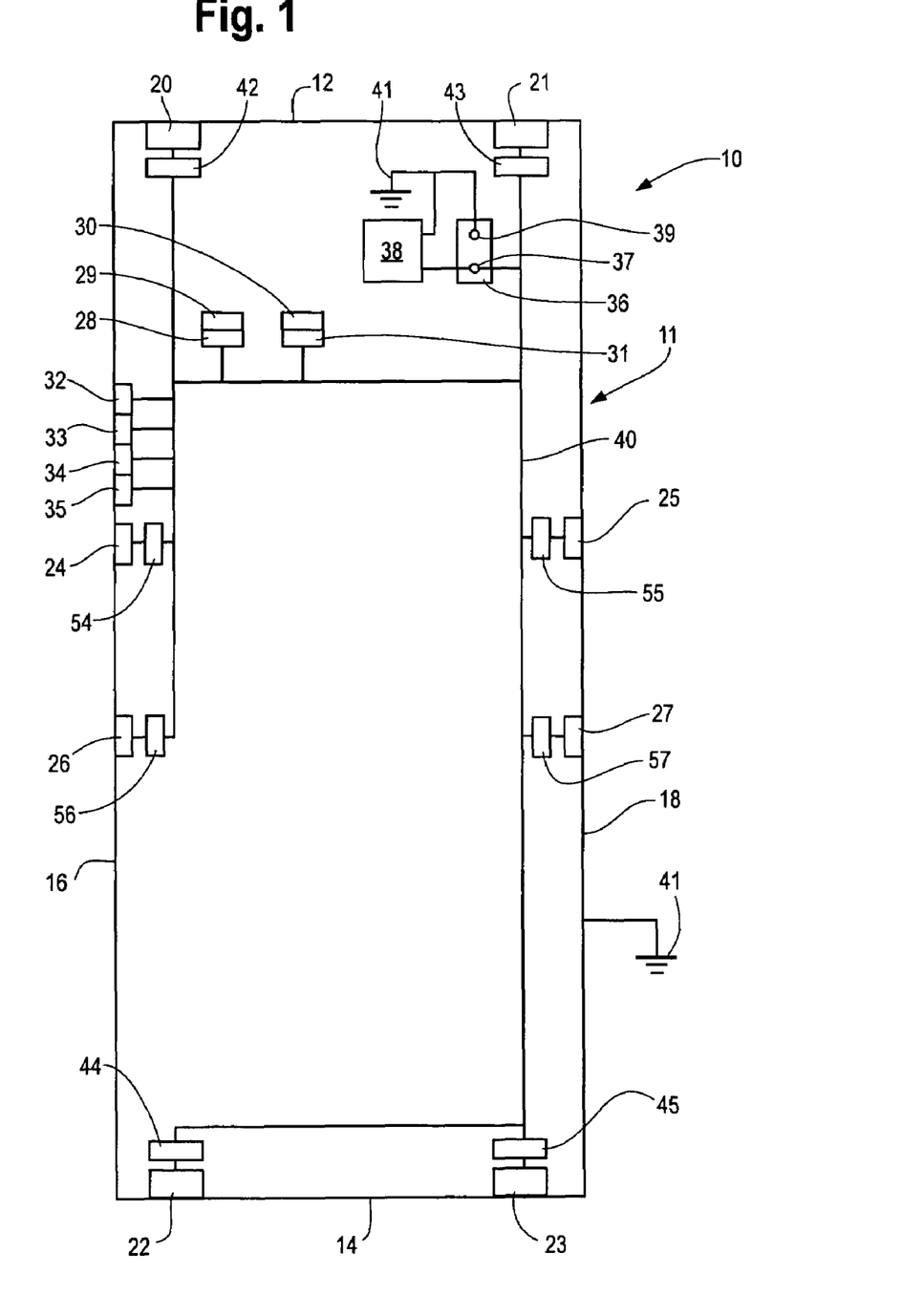
FIG. 1 is a schematic diagram of the power system of a vehicle in accordance with the present invention.

Referring to FIG. 1, a vehicle 10 in accordance with the present invention has a generally electrically conductive metal frame 11 having a forward end 12, a rearward end 14, a left side 16, and a right side 18. Positioned on opposite sides of the forward end 12 are a pair of headlights 20, 21, and positioned on opposite sides of the rearward end 14 are a pair of brake lights 22, 23. Positioned on both sides of the mid-portion of the frame 11 are electrically operated windows 24, 25, 26, 27. Positioned so a to be reachable by the driver is a controlling member 28 for operating the headlights 20, 21, and a brake pedal 30 for operating the vehicle brakes, not shown. Movement of the brake pedal 30 also activates a brake light controlling member 31 for operating the brake lights 22, 23. The vehicle also includes independent window control members 32, 33, 34, 35 for operating the windows 24-27. There are many other functions in the vehicle other than those depicted, and all of such functions are powered and controlled by the same method described herein with respect to the headlights, brake, and windows.

In accordance with the invention, the vehicle has an electrical system including a battery 36 having a power terminal 37 and a ground terminal 39, and a generator 38 configured to maintain a charge on the battery 36. A power line 40 has one end connected to the power terminal 37 of the battery 36 and the length of line 40 subsequently connects to one terminal of each of the various functions of the vehicle including the headlights 20, 21, the brake lights 22, 23, and the power operated windows 24-27. In similar fashion, the power line 40 is also connected to the headlight controlling member 28, the brake light controlling member 31, and the window controls 32-35. The ground terminal 39 of the battery 36 and the second terminal of all the various functions 20-27 and their associated controlling members are connected to the body 11 of the vehicle as a ground 41. To simplify the drawings, the ground terminals of the various functions and the various function controllers are collectively depicted in the single ground 41 attached to the body 11 of the vehicle 10.

In accordance with the prior art, the headlights of a vehicle are controlled by a switch positioned along a dedicated power line extending from the power terminal of the battery to the headlight. The dedicated line extends first to the dashboard of the vehicle where the switch is located and then to the two headlights.

Figure 2:
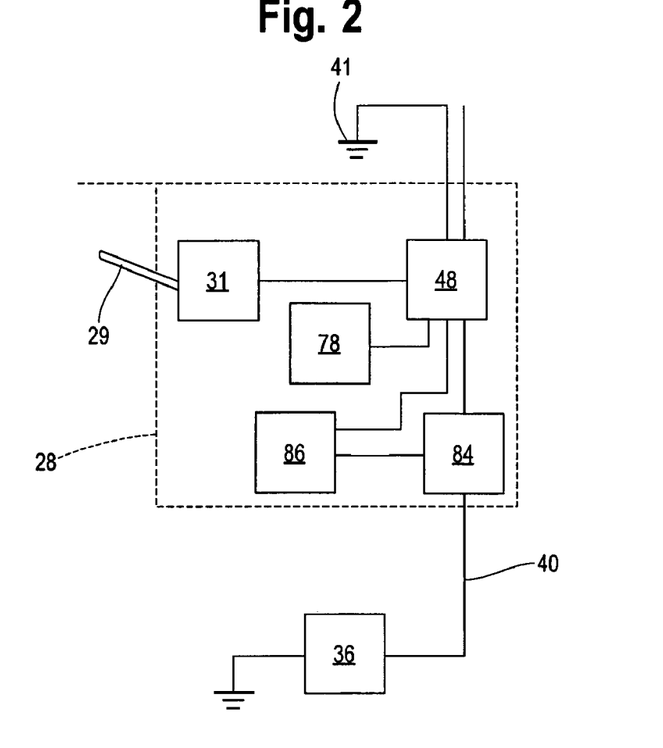
FIG. 2 is a block diagram of one control member that is representative of all control members used in the circuit shown in FIG. 1.
Figure 3:
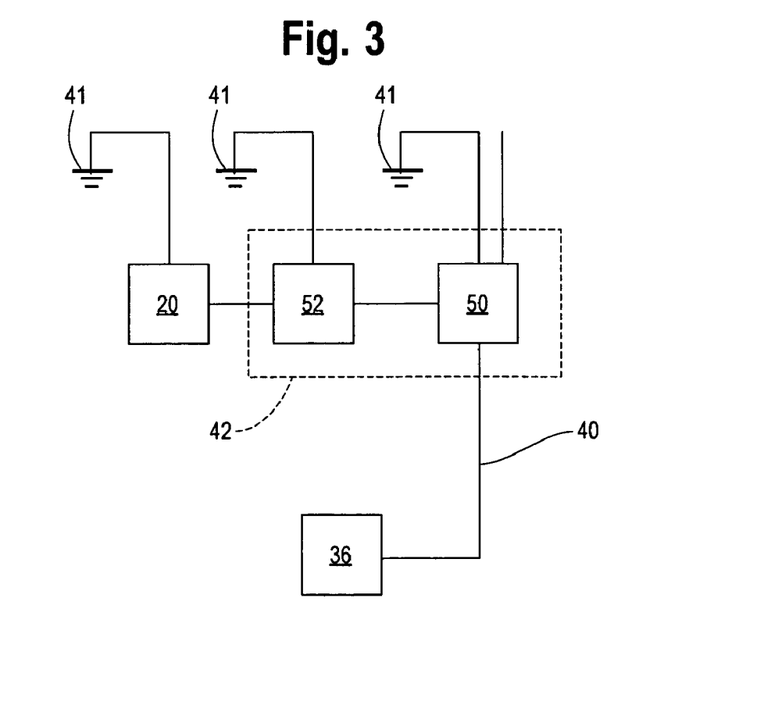
FIG. 3 is a block diagram of one code reader, operating circuit, and a function controller that is representative of all function controllers used in the circuit shown in FIG. 1.

Referring to FIGS. 1, 2 and 3, in accordance with the present invention, the controlling member 28 that controls the headlights 20, 21 is not connected to the headlights 20, 21 by a dedicated wire, but is instead connected only to the power line 40 and to ground 41. As shown in FIG. 2, the headlight controlling member 28 includes a moveable device 29 moveable from a first position indicative of an "on" condition in which the headlights 20, 21 are to be illuminated and a second position indicative of an "off" condition in which the headlights 20, 21 are not to be illuminated. The moveable device 29 has the exterior appearance of a typical light switch and it operates a selection device 31 such as a double pole switch that connects a signal generator 48 to the power line 40 in either a first orientation or a second orientation. The signal generator 48 generates a coded message that is sent down the power line 40 with the message carrying a first instruction when the signal generator 48 is in the first orientation indicating that the lights are to be "on" and the message carrying a second instruction when the signal generator 48 is in the second orientation indicating that the lights are to be "off." The message generated by the signal generator 48 is distinguishable from the message generated by any other signal generator in the vehicle 10.

In another portion of the vehicle are the headlights 20, 21. Referring to FIG. 3, headlight 20 is connected through its function controller 42 to the power line 40. The function controller 42 includes a code reader 50 that monitors the power line 40 and responds only to the message produced by the code signal generator 48. When the code reader 50 detects a message in the power line 40 identifiable as originating from the signal generator 48 and indicating that the moveable device 29 has been moved to an "on" position, it transmits that information to an associated operating circuit 52 which in turn carries out the operators instruction by applying electric power to the headlight 20 causing it to be illuminated. Conversely, when the code reader 50 detects a message in the power line 40 originating from the signal generator 48 indicating that the moveable devise 29 has been moved to the "off" position, it transmits that information to the operating circuit 52 which terminates power to the headlight 20 causing it to turn off.

A second function controller 43 identical to the first function controller 42 is connected between the power line 40 and the second headlight 21, causing the second headlight 21 to operate exactly like the first headlight 20. As a result of the use of the controlling member 28 and the function controllers 42, 43, it is not necessary to transmit information from a switch on the vehicle dashboard to the headlights 20, 21 by means of a separate dedicated wire. In similar fashion, all the function controllers of the vehicle 10 and the various controlling members can be connected to the same power line 40.

In like manner, each of the brake lights 22, 23 is connected to the same power line 40 through an associated function controller 44, 45 respectively. The function controllers 44, 45 for the brake lights 22, 23 respond to a message in the power line 40 generated by the brake light controlling member 31. The message generated by controlling member 31 is different from the message from the headlight controlling member 28, and the function controllers 44, 45 can identify this message as originating from the brake light controlling member 31.

Each of the electrically operated windows 24, 25, 26, 27 has connected thereto an associated function controller 54, 55, 56, 57 respectively, which is also connected to the power line 40. Each window function controller 54-57 monitors the power line 40 for a signal from its associated window controlling member 32-35 and power is applied to each of the electric motors, not shown, that operate the windows in response to a message in the power line 40 that is identifiable as originating only from its associated controlling member 32-35.

Figure 6:
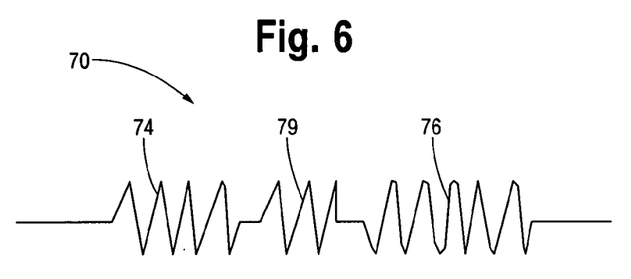
FIG. 6 is a schematic diagram of a typical message applied by a controlling member.

Referring to FIGS. 1 and 6, the message 70 is sent in a code that is either a train of binary numbers or a frequency varied sequence. In either case, the message 70 includes an identification portion 74 in which the source of the message is uniquely identified and an information portion 76, which conveys the status of the input, in the case of the headlights 20, 21, whether the device 29 is calling for the lights 20, 21 to be "on" or "off." Between the identification portion 74 and the information portion 76 is a warning signal 78 that tells the function controllers 42, 43 that are reading the signal that the identification portion 74 of the message 70 is over and that the information portion 76 will follow.

Figure 7:
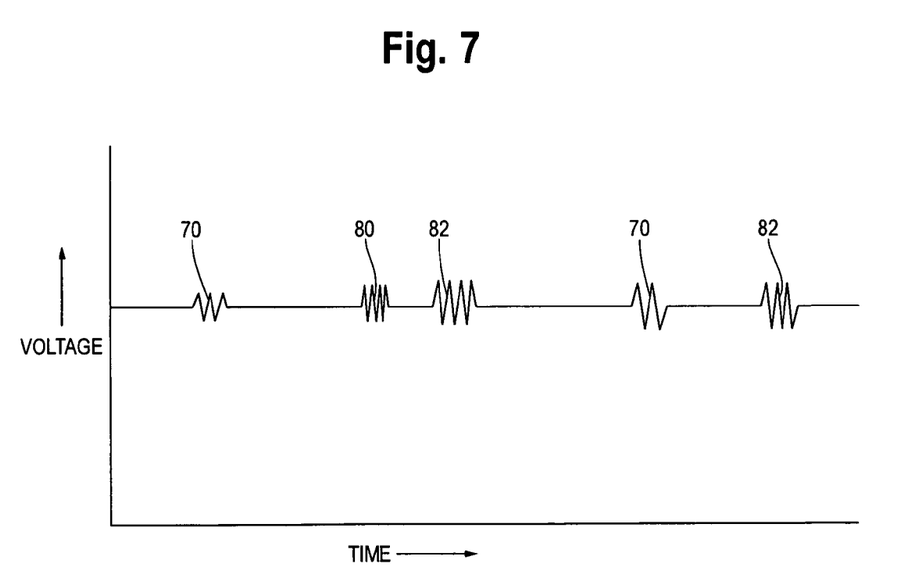
FIG. 7 is a graph of the voltage against time in the power line of a vehicle where messages are being applied to the power line in accordance with the invention.

Referring to FIGS. 2 and 7, each of the controlling members 28, 31, 32, 33, 34, 35, of which controlling member 28 is representative of all, includes a clock 78 that enables the controlling member to apply its message to the power line 40 as an asynchronized signal where the length of one message 70 is relatively short, so as to be conveyed in a period of perhaps one one-thousandth of a second, and the message 70 is not repeated until a significantly longer period of time, perhaps three hundred-thousandths of a second have elapsed. Since the messages 70 from the various function controllers 42, 43, 44, 45, 54, 55 are asynchronized by the clocks 78 of the various function controllers causing the message from each to be sent according to a different time table. A message 70 from control member 78 will rarely interfere with a message 80 from control member 31 or message 82 from control member 32, and so on. Where two or more messages do overlap, the resulting signal will be incomprehensible to all function controllers in the vehicle 10 and will be ignored by all.

Referring further to FIG. 2, each controlling member 28 also includes a coded reader 84 and a comparetor circuit 86 that enables the controlling member 28 to read the signal that it has applied to the power line 40 (or lines 40' or 40") and compare it to the signal that was sent. If the controlling member 28 cannot detect a signal on the line that conveys the necessary information to instruct its associated function controller 42, the message will not be conveyed and the device will fail to operate properly. To avoid such a failure, the controlling member 28 monitors the line 40 to detect its own message in understandable form. If an understandable message is not detected, the message is repeated at the next transmission window as determined by its associated clock 78. The message is repeated each time the window opens as determined by the clock 78, until the comparator circuit 86 detects at least one comprehendible transmission of the message. It may be desirable for the controlling member 28 to continue transmitting the message until the comparator 86 determines that the message has been properly transmitted twice, or some other number of times to insure proper reception by the associated function controller 42.

It should be appreciated that microelectronic parts including function controllers are not expensive to manufacture. As a result, it is far less expensive to manufacture a control system with each controlling member operating on its own clock 78 than to provide a master clock for the vehicle 10 and synchronize all the controlling members off the single clock. Although the interval between transmission windows for each controlling member is long compared to the length of the message 70 transmitted, the delay is in the magnitude of fractions of a second. Also, the individual clocks 78 can be set to transmit messages from critical vehicle functions, such as brake lights, more frequently than noncritical functions, such as electric windows.

As can be seen, using the method of the present invention, a single power line 40 will extend to the various functions of the vehicle, their associated function controllers, and their associated controlling members. Since each controlling member (of which controlling member 28 is representative of all) produces its own coded message that can only be read by its associated function controller (of which function controller 42 is representative of all) the information needed to carry out the control of the functions of the vehicle can be sent through the common power line 40 of the vehicle. In this fashion, the use of dedicated wires, one to each function of the vehicle, can be eliminated.

Figure 4:
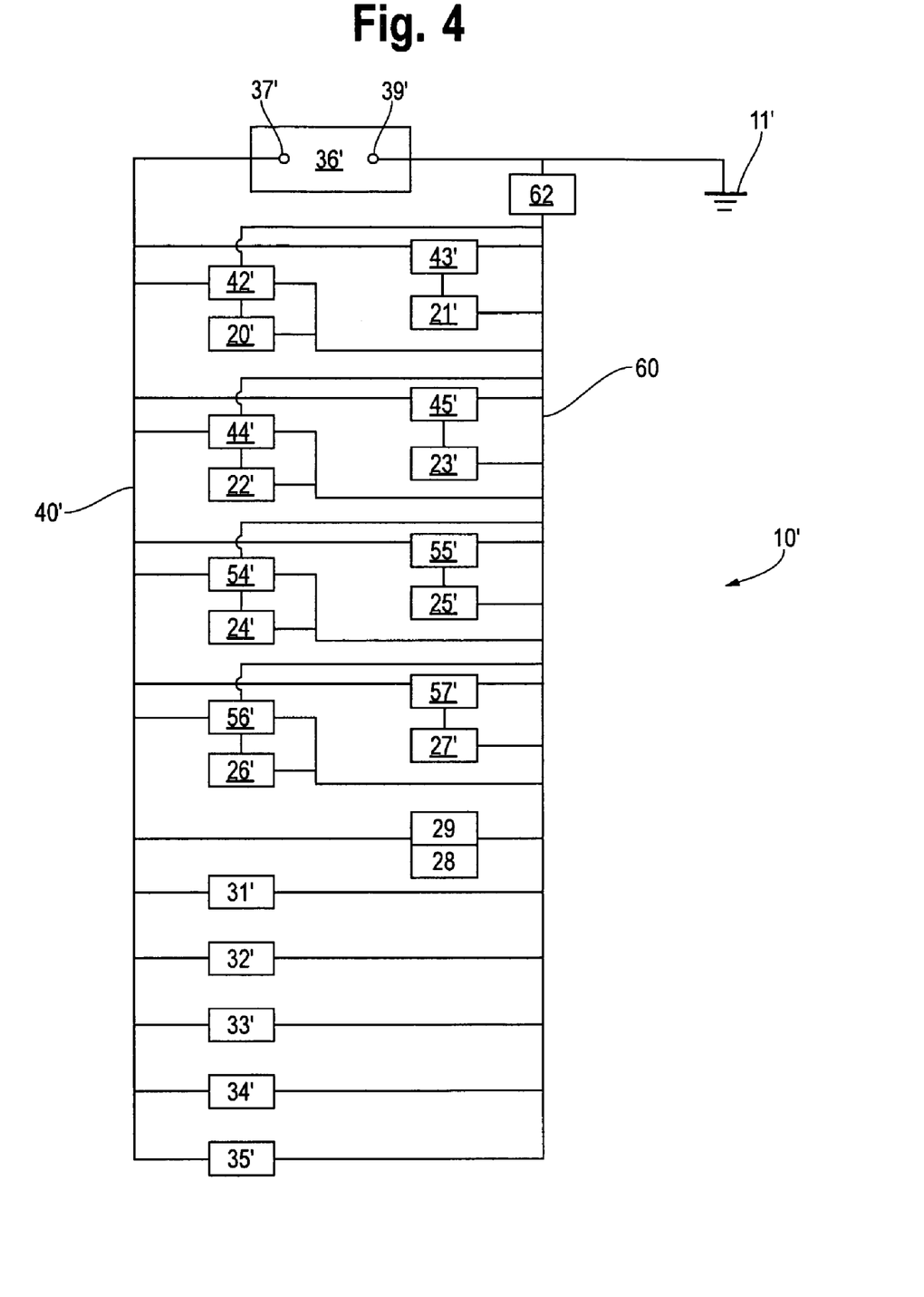
FIG. 4 is a schematic diagram of a power system for a vehicle in accordance with a second embodiment of the invention.

Referring to FIG. 4, in another embodiment of the invention, a vehicle 10' has all the electronically operative components of the vehicle 10 and like elements of vehicle 10' have like indicia numbers except that they are primed. For example, 20', 21' are headlights, 22', 23' are brake lights, 24', 25', 26', 27' are electrically operated windows, 37' is a power terminal and 39' is a ground terminal. In this embodiment, one electrical contact of all the controlling members including member 28', 31', 32', 33', 34', 35', and all the associated function controllers 42', 43', 44', 45', 54', 55', 56', 57', are connected to the power line 40' and the second electrical contact for the various devices are connected to an independent ground line 60. The ground line 60 is not directly connected to the body 11' of the vehicle 10' but is connected through a filter 62 to the ground terminal 39' of the battery 36'. By providing one independent ground line 60, any impedance from the vehicle body 11' is eliminated and noise produced in the vehicle body 10' is reduced.

It should be appreciated that while the messages from the various controlling members have been described as being applied to the power line 40', since an electric signal requires two electric contacts. It is within the spirit of the invention to apply the messages to the ground line 60 rather than the power line 40'.

Referring to FIG. 5 in another embodiment of the invention, a vehicle 10" has all the electrically operative components of the vehicle 10 and like elements of vehicle 10", have like indicia numbers except that they are double primed. For example, 11" is the electrically conductive frame, 21" and 22" are headlights, 24", 25", 26", 27", are electrically operated windows, 36" is the battery, 37"is the power terminal, 38" is the generator, 39" is the ground terminal, 40" is a line connecting to the various elements and 41" is a ground. In this embodiment, a power line 40" connects to all the controlling members 28", 31", 32", 33", 34"35" and to all the function controllers 42", 43", 44", 45", 54", 55", 56", 57", and any other device in the vehicle 10 that draws electric power. A separate message line 64, in the form of a loop connected in series to all the message sending elements of the controlling members 31', 32', 33', 34', 35' and all the message receiving elements of the function controllers 42", 43", 44", 45", 54", 55" such that all the controlling members and all the function controllers are in the same loop. FIG. 5 does not depict an independent ground line such as ground line 60 shown in FIG. 4, although it should be appreciated that an independent ground line and a filter similar to filter 62 can be incorporated into this embodiment of the invention.

Although the present invention has been described with respect to three embodiments, it will be appreciated that many modifications and variations can be made without departing from the true spirit and scope of the invention. It is therefore the intent of the appended claims to cover all such modifications and variations that fall within the true spirit and scope of the invention.

What is claimed:

1. The method of controlling a plurality of electrically powered functions of a vehicle including a first function and a second function, comprising the steps of:
   providing a source of electric power having a power terminal and a ground terminal,
   providing a power line connected to said power terminal and a ground line connected to said ground terminal,
   connecting all of said plurality of electrically powered functions including said first and second function to said source of electric power by said power line and ground line,
   providing a first controlling member capable of generating a first coded message where said first coded message includes an identification portion for identifying a source of said first coded message and an instruction portion containing instructions to be carried out by said first function,
   connecting said first controlling member to said power line and said ground line wherein said first coded message is applied to said power line,
   providing a first function controller including a first reader and a first operating circuit wherein said first reader is capable of reading only said first coded message in said power line and said first operating circuit is capable of controlling said first function, and
   connecting said first function controller to said power line and said ground line wherein said first reader will read only said first coded message and said first operating circuit will control said first function to perform in accordance with said instructions portion without a dedicated wire extending between said first controlling member and said first function,
   said first controlling member further including a signal detector and a message comparator circuit for comparing a message detected in said power line with a message transmitted by said first controlling member, and retransmitting said first coded message if said comparator circuit does not detect that said first coded message was applied to said power line in understandable form.

2. The method of claim 1 and further comprising the step of providing a filter, and
   connecting said filter between said ground line and said ground terminal of said source of electric power wherein said ground line is independent of impedance and noise from a body of said vehicle.

3. The method of claim 1 wherein said ground line is a body of said vehicle.

4. The method of claim 1 wherein said plurality of electrically powered functions includes a second function and said method includes the further steps of
   providing a second controlling member capable of generating a second coded message different from said first coded message where said second coded message includes an identification portion for identifying a source of said second coded message and an instruction portion containing instructions to be carried out by said second function,
   connecting said second controlling member to said power line and said ground line wherein said second coded message is applied to said power line,
   providing a second function controller including a second reader and a second operating circuit wherein said second reader is capable of reading only said second coded message and said second operating circuit is capable of controlling said second function, and
   connecting said second function controller to said power line and said ground line wherein said second reader will read only said second coded message and said second operating circuit will control said second function to perform in accordance with said instruction portion of said second coded message.

5. The method of claim 4 and further comprising the steps of providing a filter, and
   connecting said ground line through said filter to said ground terminal of said body of said vehicle.

6. The method of claim 4 wherein said ground line is a body of said vehicle.

7. A device for controlling a plurality of electrically powered functions including a first function and a second function, wherein each said electrically powered function is controlled from a remote location, said device comprising:
   a first controlling member for controlling said first function,
   a second controlling member for controlling said second function,
   a line connecting all of said plurality of electrically powered functions including said first and second functions and to said first and second controlling members,
   said first controlling member applying a first coded message to said line where said first coded message includes an identification portion for identifying a source of said first coded message and an instruction portion containing instructions to be carried out by said first function,
   said second controlling member applying a second coded message to said line where said second coded message includes an identification portion for identifying a source of said second coded signal and an instruction portion containing instructions to be carried out by said second function,
   said identification portion of said first coded message being different from said identification portion of said second coded message,
   said first function including a first reader for reading only said first coded message from said line and a first operating circuit wherein said first function will respond to said instruction portion of said first coded message and cause said first function to perform in accordance with said instructions of said first controlling member without a dedicated wire connecting said first controlling member to said first function, and
   said second function including a second reader for reading only said second coded message from said line and a second operating circuit wherein said second function will respond to said instruction portion of said second coded message and cause said second function to perform in accordance with said instructions from said second controlling member without a dedicated wire connecting said second controlling member to said second function, and
   said first controlling member including a signal detector and a message comparator circuit for comparing a message detected in said line with a message transmitted by said first controlling member, and said first controlling member retransmits said first coded message if said comparator circuit does not detect that said first coded message was applied to said line in understandable form.

8. The device of claim 7 wherein said line is a power line of a vehicle and said device further includes a ground terminal of each of said first controlling member, said second controlling member, said first function and said second function connected to an electrically conductive body of said vehicle.

9. The device of claim 7 wherein said line is a power line and said device further comprising:
  a filter connected to a ground terminal of a source of electric power, and
  a ground line connected to a ground terminal of each of said first controlling member, said second controlling member, said first function and said second function and connected to said ground terminal of said source of electric power through said filter wherein said ground line is independent of an electrically conductive body of said vehicle.

10. The device of claim 7 wherein said line is a power line and said device further comprising:
  a ground,
  said first and second controlling members and said first and second functions connected to said ground, and
  said first coded message and said second coded message applied to one of said line and said ground line and said first reader and said second reader reading said first and second codes from said one of said line and said ground line.

11. The device of claim 7 wherein said line is a signal line independent of a power line for providing power to said first and second functions and wherein:
  said first and second coded messages are applied to said signal line by said first and second controlling members,
  said first reader reading said first coded message from said signal line to control said first function, and
  said second reader reading said second coded message from said signal line to control said second function.

12. The device of claim 7 wherein:
  said first controlling member includes a first clock for controlling a time at which said first coded message is applied to said line,
  said second controlling member includes a second clock for controlling a time at which said second coded message is applied to said line, and
  said first and second clocks are asynchronized.

13. A device for controlling a plurality of electrically powered functions of a vehicle including a first function and a second function, wherein each said electrically powered function is controlled from a remote location within said vehicle, said device comprising:
  a source of electric power,
  a first controlling member for controlling said first function,
  a second controlling member for controlling said second function,
  a power line connecting said source of electric power to all of said plurality of functions including said first and second functions and to said first and second controlling members,
  said first controlling member generating a first coded message in said power line,
  said second controlling member generating a second coded message in said power line,
  first coded message being different from said second coded message,
  said first function including a first reader for reading only said first coded message and a first operating circuit wherein said first function will respond to said first coded message and cause said first function to perform in accordance with said instructions of said first controlling member without a dedicated wire connecting said first controlling member to said first function,
  said second function including a second reader for reading only said second coded message and a second operating circuit wherein said second function will respond to said of said second coded message and cause said second function to perform in accordance with said instructions from said second controlling member without a dedicated wire connecting said second controlling member to said second function,
  said first controlling member including a signal detector and a message comparator circuit for comparing a message detected in said power line with a message transmitted by said first controlling member, and said first controlling member retransmits said first coded message if said comparator circuit does not detect that said first coded message was applied to said power line in understandable form.

14. The device of claim 13 wherein said vehicle includes an electrically conductive body and said device further includes a ground terminal of each of said first controlling member, said second controlling member, said first function and said second function connected to said electrically conductive body.

15. The device of claim 13 and further comprising:
  a filter connected to a ground terminal of said source of electric power, and
  a ground line connected to a ground terminal of each of said first controlling member, said second controlling member, said first function and said second function and connected to said ground terminal of said source of electric power through said filter wherein said ground line is independent of an electrically conductive body of said vehicle.

16. The device of claim 13 and further comprising:
  a ground,
  said first and second controlling members and said first and second functions connected to said ground, and
  said first coded message and said second coded message applied to one of said power line and a ground line and said first reader and said second reader reading said first and second coded messages from said one of said power line and said ground line.

17. The device of claim 13 and further comprising:
  a signal line connected to said first controlling member, said second controlling member, said first function and said second function,
  said signal line independent of said power line and said ground, and
  said first and second coded messages applied to said signal line by said first and second controlling members,
  said first reader reading said first coded messages from said signal line to control said first function, and
  said second reader reading said second coded messages from said signal line to control said second function.

* * * * *

UNITED STATES PATENT AND TRADEMARK OFFICE
CERTIFICATE OF CORRECTION

| | | |
|---|---|---|
| PATENT NO. | : 7,509,176 B2 | Page 1 of 1 |
| APPLICATION NO. | : 11/443583 | |
| DATED | : March 24, 2009 | |
| INVENTOR(S) | : Jack Chen | |

It is certified that error appears in the above-identified patent and that said Letters Patent is hereby corrected as shown below:

In column 10 line 13, beginning of the line, delete "of said"

Signed and Sealed this

Twenty-second Day of September, 2009

David J. Kappos
*Director of the United States Patent and Trademark Office*